United States Patent
Keitsch et al.

(10) Patent No.: US 12,463,228 B2
(45) Date of Patent: Nov. 4, 2025

(54) METHOD FOR A FROST START OF A FUEL CELL DEVICE, FUEL CELL DEVICE AND MOTOR VEHICLE HAVING A FUEL CELL DEVICE

(71) Applicant: AUDI AG, Ingolstadt (DE)

(72) Inventors: Oliver Keitsch, Heilbronn (DE); Armin Siebel, Neckarsulm (DE); Sebastian Voigt, Heilbronn (DE)

(73) Assignee: AUDI AG, Ingolstadt (DE)

( * ) Notice: Subject to any disclaimer, the term of this patent is extended or adjusted under 35 U.S.C. 154(b) by 382 days.

(21) Appl. No.: 18/004,434

(22) PCT Filed: Oct. 25, 2021

(86) PCT No.: PCT/EP2021/079466
§ 371 (c)(1),
(2) Date: Jan. 5, 2023

(87) PCT Pub. No.: WO2022/090121
PCT Pub. Date: May 5, 2022

(65) Prior Publication Data
US 2023/0299321 A1    Sep. 21, 2023

(30) Foreign Application Priority Data
Oct. 28, 2020 (DE) .................. 10 2020 128 273.7

(51) Int. Cl.
*H01M 8/04* (2016.01)
*H01M 8/0267* (2016.01)
(Continued)

(52) U.S. Cl.
CPC ..... *H01M 8/04302* (2016.02); *H01M 8/0267* (2013.01); *H01M 8/248* (2013.01)

(58) Field of Classification Search
CPC . H01M 8/04302; H01M 8/0267; H01M 8/248
(Continued)

(56) References Cited

U.S. PATENT DOCUMENTS

| 2005/0058865 A1 | 3/2005 | Thompson et al. |
| 2012/0183814 A1* | 7/2012 | Boegershausen ............ H01M 8/04268 429/429 |
| 2019/0181476 A1* | 6/2019 | Jeong ............... H01M 8/04358 |

FOREIGN PATENT DOCUMENTS

| DE | 102016118511 A1 | 3/2018 |
| DE | 102018210176 A1 | 12/2019 |

(Continued)

OTHER PUBLICATIONS

International Search Report, mailed Feb. 25, 2022, for International Patent Application No. PCT/EP2021/079466. (2 pages).
(Continued)

*Primary Examiner* — James M Erwin
(74) *Attorney, Agent, or Firm* — Seed Intellectual Property Law Group LLP

(57) ABSTRACT

A method for a frost start of a fuel cell device having a fuel cell stack, in which a plurality of fuel cells electrically switched in series is pressed by a compression force of a clamping device between two end plates, comprises determining the presence of frost start conditions, reducing the compression force by means of the clamping device, and operating the fuel cells in a frost start operation, in which a compression force acting on the fuel cells of the fuel cell stack and reduced as compared to that of a normal operation is maintained. A fuel cell device as well as a motor vehicle having a fuel cell device with a controller adapted to carry out such a method for a frost start of the fuel cell device are also provided.

10 Claims, 2 Drawing Sheets

(51) Int. Cl.
*H01M 8/04302* (2016.01)
*H01M 8/248* (2016.01)

(58) Field of Classification Search
USPC .......................................................... 429/429
See application file for complete search history.

(56) References Cited

FOREIGN PATENT DOCUMENTS

| | | | |
|---|---|---|---|
| EP | 2903069 A1 | 8/2015 | |
| EP | 3147986 A1 | 3/2017 | |
| JP | 2008262822 A | 10/2008 | |
| KR | 20130017960 A * | 2/2013 | .......... H01M 8/0438 |

OTHER PUBLICATIONS

Written Opinion of the International Searching Authority, mailed Feb. 25, 2022, for International Patent Application No. PCT/EP2021/079466. (5 pages).

\* cited by examiner

METHOD FOR A FROST START OF A FUEL CELL DEVICE, FUEL CELL DEVICE AND MOTOR VEHICLE HAVING A FUEL CELL DEVICE

BACKGROUND

Technical Field

Embodiments of the invention relate to a method for a frost start of a fuel cell device having a fuel cell stack, in which a plurality of fuel cells electrically switched in series is pressed by a compression force of a clamping device between two end plates. Embodiments of the invention also relate to a fuel cell device as well as a motor vehicle having a fuel cell device.

Description of the Related Art

Fuel cell devices are used for the chemical transformation of a fuel with oxygen to form water in order to create electric energy. For this, fuel cells contain as their key component the so-called membrane electrode assembly (MEA), which is an assemblage of a proton-conducting membrane and an electrode arranged on either side of the membrane (anode and cathode). Furthermore, gas diffusion layers (GDL) may be arranged on either side of the membrane electrode unit at the sides of the electrodes facing away from the membrane. In operation of the fuel cell device having a plurality of fuel cells assembled into a fuel cell stack, the fuel, especially hydrogen $H_2$ or a gas mixture containing hydrogen, is supplied to the anode, where an electrochemical oxidation of $H_2$ to $H^+$ takes place, giving off electrons. Through the electrolyte or the membrane which separates the reaction spaces from each other in gas-tight manner and electrically insulates them, a (water-bound or water-free) transport of the protons $H^+$ from the anode space to the cathode space occurs. The electrons provided at the anode are taken by an electrical line to the cathode. The cathode is supplied with oxygen or a gas mixture containing oxygen, so that a reduction of $O_2$ to $O^{2-}$ occurs, taking up electrons. At the same time, these oxygen anions react in the cathode space with the protons transported across the membrane to form water. This water must be taken out from the fuel cell and the fuel cell stack until a moisture level is reached which is required for the operation of the fuel cell system.

Fuel cell devices therefore require a careful water management, since on the one hand it is necessary to prevent too much water being present in the fuel cell or in the fuel cell stack, resulting in blockage of the flow ducts for the supply of reactants. On the other hand, if there is too little water in the fuel cell, the proton conductivity of the membrane is limited, so that one must make sure to have adequate humidity and water supply for the membrane.

In order to provide sufficient oxygen from the air for the plurality of fuel cells assembled in a fuel cell stack, air with the oxygen contained therein is compressed by means of a compressor in the cathode circuit for supplying the cathode spaces of the fuel cell stack, so that relatively warm and dry compressed air is present, the humidity of which is not sufficient for use in the fuel cell stack for the membrane electrode assembly. Therefore, a humidifier is used, having the effect of transferring moisture in the case of two gaseous media with different moisture content to the more dry medium by taking the dry air provided by the compressor past a humidifier membrane which is permeable to water vapor, the other side of which is bathed in the moist exhaust air from the fuel cell stack.

The problem is when frost conditions are present for a start of the fuel cell system, i.e., conditions in which water freezes. This can mean that the necessary flow ducts for the reactant gases and the product water are blocked with ice, for which reason it is known how to carry out a drying procedure when switching off the fuel cell device. Upon starting the fuel cell device there may likewise be problems, since while the fuel cell device is warming up to achieve its operating temperature there may be temperature differences in the fuel cell stack relating to the supplying of the media, i.e., the gaseous reactants, as well as a coolant used to control the temperature of the fuel cell stack, generally consisting of a cooling liquid having a higher thermal capacity than that of the reactants.

In mobile applications, one specific goal is to carry out the start of the fuel cell device as quickly as possible, but the start is limited or delayed by the thermal masses of the fuel cell stack and the coolant, by ice blockage if any in flow ducts, and by the maximum power uptake of the vehicle.

In US 2005/058 865 A1, a fuel cell stack is described, in the fuel cells of which electrical heating elements are integrated between enclosing end plates, if frost conditions are present during the start.

In DE 10 2016 118 511 A1, an electrical contact device for a fuel cell is described, the contact regions of which can be used to generate heat as resistance heating elements.

In JP 2008-262 822 A, a method is described for stopping and starting a fuel cell device for a fuel cell vehicle. At each stop, a compression device compresses the electrolyte membrane in the stacking direction of the membrane electrode assembly by an increasing of the pressure, this compressed state being maintained for the entire duration until a new start occurs. The compression of the electrolyte membrane prevents it from taking up water, so that the water uptake capacity is already provided once again in case of a frost start, since at each new start the compression of the electrolyte membrane is ended by a pressure reduction until the increased pressure reaches a value of zero, i.e., the pressure increase occurring during the stop is completely and exactly reversed.

In KR 2013 0 017 960 A, a pressing unit is used to increase the electrical resistance at the marginal fuel cells of a fuel cell stack by reducing the compression force acting on them, so that these are operated and heated with worse efficiency.

BRIEF SUMMARY

Embodiments relate to a method for a frost start of a fuel cell device having a fuel cell stack, in which a plurality of fuel cells electrically switched in series is pressed by a compression force of a clamping device between two end plates, comprising: determining the presence of frost start conditions, reducing the compression force by means of the clamping device, and operating the fuel cells in a frost start operation, in which a compression force acting on the fuel cells of the fuel cell stack and reduced as compared to that of a normal operation is maintained.

Some embodiments provide a method with which a more uniform heating can be realized across the entire fuel cell stack. Furthermore, an improved fuel cell device and an improved motor vehicle may be provided.

The method described above is characterized in that each individual contact resistance (ohmic resistance) between the fuel cells of the fuel cell stack is increased in the frost start operation by reducing the compression force by the clamping device.

In this regard, it may be advantageous for a temperature of the fuel cell stack to be determined continuously or cyclically, and for the compression force by means of the clamping device to be set in dependence on the detected temperature. Thus, the clamping device can actively control and/or regulate the compression force in dependence on the temperature of the fuel cell stack or in dependence on the ambient temperature.

In the frost start operation, the compression force of the clamping device may be increased continuously or in steps until such time as a given normal temperature of the fuel cell stack is reached. The increasing of the compression force further reduces the ohmic resistance across the entire fuel cell stack.

The fuel cell device upon reaching the normal temperature can be converted to the normal operation, in which a compression force is exerted on the fuel cells which is increased as compared to that of the frost start operation. Thus, in the normal operation, the once more increased compression force ensures that the necessary electrical conductivity prevails between the unit cells of the fuel cell stack.

For an additional heating of the stack, it is possible for the fuel cells in the frost start operation to be furthermore operated in oxygen depletion.

For an additional heating of the stack, it is possible for the fuel cells in the frost start operation to be furthermore operated with a voltage reduced as compared to that of the normal operation. One may consider for this a reduced voltage of less than 0.4 Volt per unit cell.

An efficient clamping/pressing of the unit cells as well as a better adjusting of the active compression force can be achieved for example in that the compression force on the cell series is set in dependence on the pressure in an air bellows.

An efficient clamping/pressing of the unit cells as well as a better adjusting of the active compression force can be achieved alternatively for example in that the clamping device is formed with tightening straps, the tension of which is set with an electrical actuator.

An efficient clamping/pressing of the unit cells as well as a better adjusting of the active compression force can be achieved alternatively for example in that the clamping device is formed with pull rods, the tension of which is set with an electrical actuator.

The mentioned effects and benefits also hold accordingly for a fuel cell device having an adjustable clamping device for setting the compression force on the fuel cells stacked between the two end plates, being formed with a controller which is adapted to carry out a method as mentioned above, as well as for a motor vehicle having such a fuel cell device.

The features and combinations of features mentioned above in the description as well as the features and combinations of features mentioned below in the description of the figures and/or shown solely in the figures can be used not only in the particular indicated combination, but also in other combinations or standing alone. Thus, embodiments not shown or explained explicitly in the figures, yet deriving and producible from the explained embodiments by separated combinations of features shall also be deemed to be encompassed and disclosed by the present disclosure.

BRIEF DESCRIPTION OF THE SEVERAL VIEWS OF THE DRAWINGS

Further benefits, features and details will emerge from the claims, the following description of embodiments, and the drawings.

DETAILED DESCRIPTION

Figure 1:
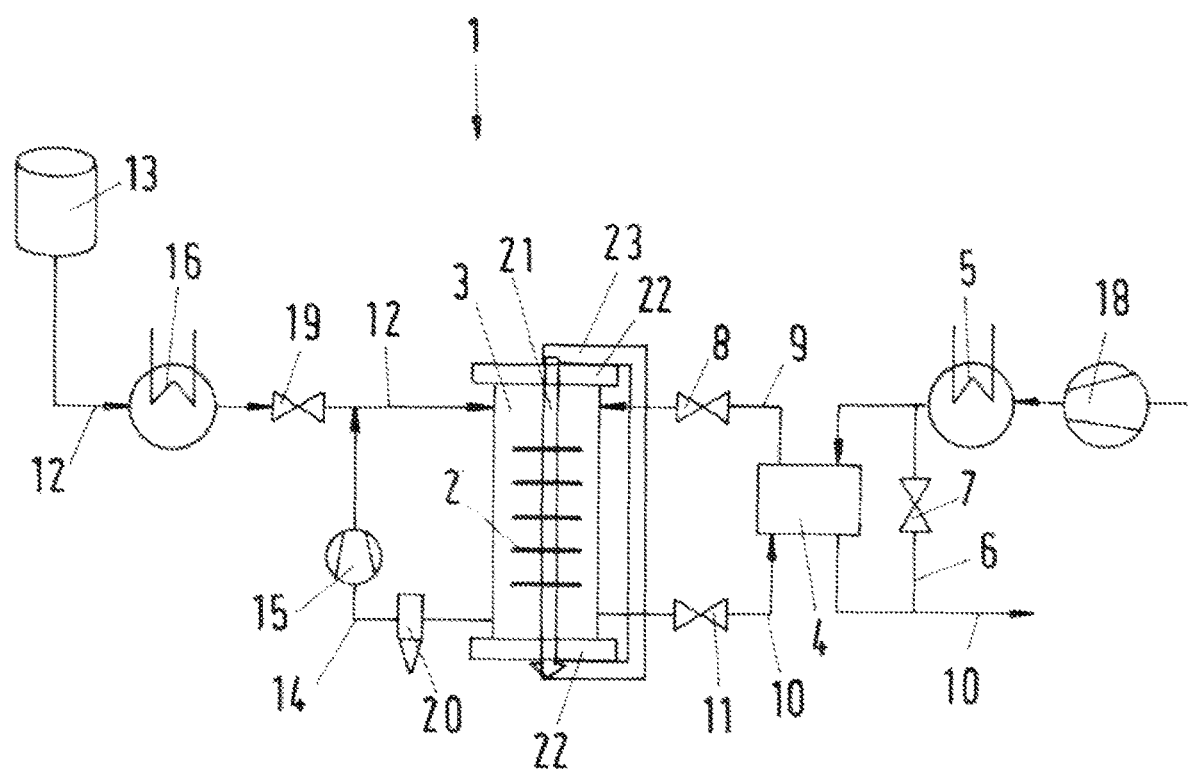
FIG. 1 shows a schematic representation of a fuel cell device.

FIG. 1 shows schematically a fuel cell device 1 comprising a plurality of fuel cells 2 assembled into a fuel cell stack 3.

Each of the fuel cells 2 comprises an anode, a cathode, as well as a proton-conducting membrane separating the anode from the cathode. The membrane is formed from an ionomer, such as a sulfonated tetrafluoroethylene polymer (PTFE) or a polymer of perfluorinated sulfonic acid (PFSA). Alternatively, the membrane can be formed as a sulfonated hydrocarbon membrane.

The anodes and/or the cathodes can additionally have a catalyst mixed in with them, the membranes being coated on their first side and/or on their second side with a catalyst layer consisting of a precious metal or a mixture containing precious metals such as platinum, palladium, ruthenium or the like, which serve as reaction accelerators in the reaction of the particular fuel cell 2.

Through an anode space, fuel can be supplied to the anodes (for example, hydrogen) from a fuel tank 13. In a polymer electrolyte membrane fuel cell (PEM fuel cell), fuel or fuel molecules are split into protons and electrons at the anode. The PEM lets through the protons but it is not permeable to the electrons. At the anode the following reaction occurs for example: $2H_2 \rightarrow 4H^+ + 4e^-$ (oxidation/electron surrender). While the protons pass through the PEM to the cathode, the electrons are taken by an external circuit to the cathode or to an energy accumulator.

Through a cathode space, the cathode can be supplied with cathode gas (such as oxygen or air containing oxygen), so that the following reaction occurs at the cathode side: $O_2 + 4H^+ + 4e^- \rightarrow 2H_2O$ (reduction/electron uptake).

In the fuel cell stack 3, multiple fuel cells 2 are assembled into a series between two end plates 22, to which a compression force is applied by a clamping device 23, in order to assure the necessary tightness and the contact pressure needed for the electrical conductivity of the stack. Due to the many fuel cells 2, a sufficiently large quantity of cathode gas must be provided, so that a large cathode gas mass flow or fresh gas flow is provided by a compressor 18, and the temperature of the cathode gas increases greatly on account of its being compressed. The conditioning of the cathode gas or the fresh air gas flow, i.e., its adjusting in terms of the desired temperature and humidity in the fuel cell stack 3, occurs in an intercooler 5, situated downstream from the compressor 18, and a humidifier 4, situated downstream from the latter, bringing about a moisture saturation of the membranes of the fuel cells 2 in order to boost their efficiency, since this favors the proton transport. In order to take away the heat generated in a normal operation of the fuel cells 2, a coolant line runs through the fuel cell stack 3, being a component of a coolant circuit, not otherwise shown.

The compression force on the cell series can be set by means of the clamping device 23, whose clamping means, such as pull rods, tightening straps, or the like, can be adjusted for example with an electrically operated actuator-likewise not otherwise shown. Thanks to this adjustment possibility for the compression force, the fuel cell device 1 can be switched between a frost start operation and a normal operation.

Figure 2:
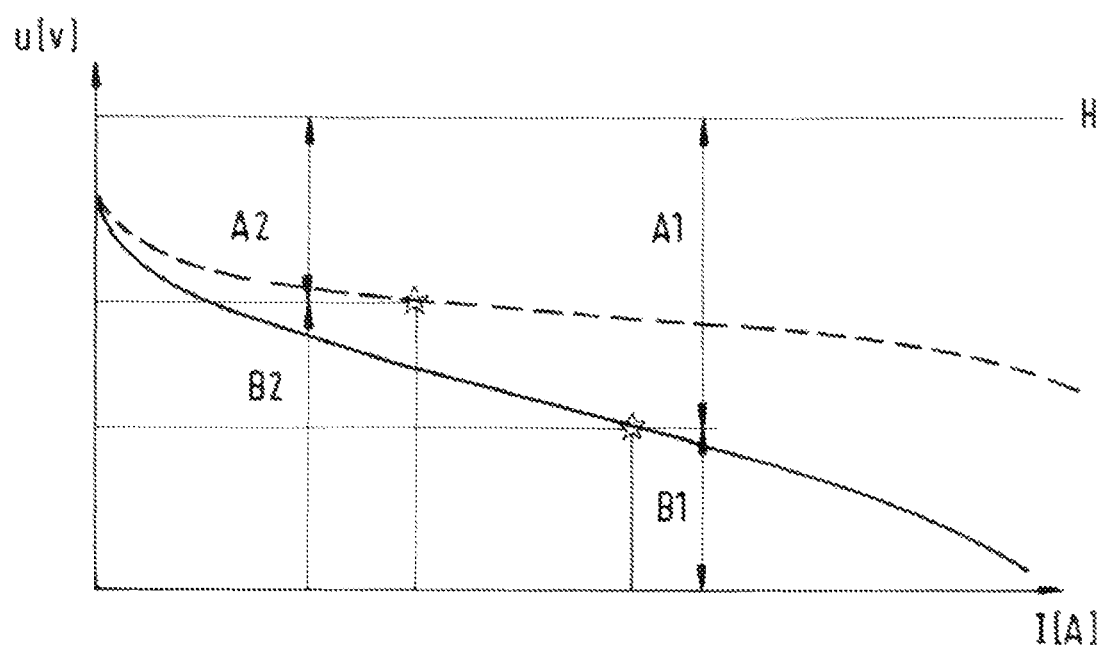
FIG. 2 shows a diagram representing, by dashes, the voltage/current characteristic of a regular operation (normal operation) of the fuel cell device, and by solid line the voltage/current characteristic of a frost start operation of the fuel cell device with reduced compression force on the unit cells.

The method for the frost start can be comprehended more easily with the aid of the diagram of FIG. 2. The U/I characteristic of the frost start operation with reduced compression force on the cell series has decreased as compared to the U/I characteristic of the normal operation with regular compression force on the cell series. There is also shown the fraction A1 of waste heat in the frost start operation, the fraction B1 of electrical power in the frost start operation, the fraction A2 of waste heat in the normal operation, the fraction B2 of electrical power in the normal operation and the heating value H of the fuel ($H_2$).

The method involves the steps of determining the presence of frost start conditions, reducing the compression force by means of the clamping device 23, and operating the fuel cells 2 in the frost start operation, in which the compression force acting on the fuel cells 2 of the fuel cell stack 3 and reduced as compared to that of a normal operation is maintained.

A temperature of the fuel cell stack 3 may be detected continuously or cyclically by means of a temperature sensor, and the compression force by means of the clamping device 23 may be set in dependence on the detected temperature. The compression force of the clamping device 23 is then increased continuously or in steps until such time as a given normal temperature of the fuel cell stack 3 is reached. Upon reaching the normal temperature, the fuel cell device 1 is converted to the normal operation, in which a compression force is exerted on the fuel cells 2 which is increased as compared to that of the frost start operation, so that a sufficient contacting of the unit cells is achieved.

It is additionally possible for the fuel cells 2 in the frost start operation to be furthermore operated in oxygen depletion. Moreover, it is possible for the fuel cells 2 in the frost start operation to be furthermore operated with a voltage reduced as compared to that of the normal operation.

In a fuel cell device 1 having a controller which is adapted to carry out a method, the aforementioned benefits for a frost start can be utilized and a degradation of the fuel cell stack 3 can be prevented or at least alleviated. This holds especially when the fuel cell device 1 is arranged in a motor vehicle.

With the method, the efficiency of the drive system of the motor vehicle can be improved, because this lowers the relative fuel costs, improves the ecological balance, and increases the range. This further boosting of the efficiency in the fuel cells 2 will make the frost start, which is already challenging, even more difficult in future, since the heating power is further lowered.

Embodiments of the invention work against this effect by temporarily reducing the efficiency of the fuel cells 2 and thus increases the waste heat for the heating of the fuel cell stack 3 while at the same time increasing the electrical power. This increases the design option for the frost start procedure and the fuel cell stack 3 can be heated more quickly. For the user, this means that the vehicle is ready to drive sooner.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for a frost start of a fuel cell device having a fuel cell stack, in which a plurality of fuel cells electrically switched in series is pressed by a compression force of a clamping device between two end plates, and having a controller which is adapted to carry out the method for the frost start of the fuel cell device, the method comprising:
   determining the presence of frost start conditions,
   reducing the compression force using the clamping device, and
   operating the fuel cells in a frost start operation, in which a compression force acting on the fuel cells of the fuel cell stack and reduced as compared to that of a normal operation is maintained.

2. The method according to claim 1, wherein a temperature of the fuel cell stack is detected continuously or cyclically, and the compression force is set by the clamping device in dependence on the detected temperature.

3. The method according to claim 2, wherein the compression force of the clamping device is increased continuously or in steps until such time as a given normal temperature of the fuel cell stack is reached.

4. The method according to claim 3, wherein the fuel cell device upon reaching the normal temperature is converted to the normal operation, in which a compression force is exerted on the fuel cells which is increased as compared to that of the frost start operation.

5. The method according to claim 1, wherein the fuel cells in the frost start operation are furthermore operated in oxygen depletion.

6. The method according to claim 1, wherein the fuel cells in the frost start operation are furthermore operated with a voltage reduced as compared to that of the normal operation.

7. The method according to claim 1, wherein the clamping device is formed with tightening straps, the tension of which is set with an electrical actuator.

8. The method according to claim 1, wherein the clamping device is formed with pull rods the tension of which is set with an electrical actuator.

9. A fuel cell device having an adjustable clamping device for setting the compression force on fuel cells stacked between two end plates, and having a controller which is adapted to carry out a method for a frost start of the fuel cell device, the method comprising:
   determining the presence of frost start conditions,
   reducing the compression force using the clamping device, and
   operating the fuel cells in a frost start operation, in which a compression force acting on the fuel cells and reduced as compared to that of a normal operation is maintained.

10. A motor vehicle having a fuel cell device according to claim 9.

* * * * *